US010801551B2

(12) United States Patent
Ottow et al.

(10) Patent No.: US 10,801,551 B2
(45) Date of Patent: Oct. 13, 2020

(54) POWER TRANSMISSION DEVICE

(71) Applicant: ROLLS-ROYCE CORPORATION, Indianapolis, IN (US)

(72) Inventors: Nathan W. Ottow, Indianapolis, IN (US); Nathan J. Cooper, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 852 days.

(21) Appl. No.: 14/921,561

(22) Filed: Oct. 23, 2015

(65) Prior Publication Data

US 2017/0114835 A1    Apr. 27, 2017

(51) Int. Cl.

| | |
|---|---|
| F16D 3/06 | (2006.01) |
| F02C 7/06 | (2006.01) |
| F02C 3/107 | (2006.01) |
| F16D 3/72 | (2006.01) |
| F16D 1/10 | (2006.01) |
| F01D 5/02 | (2006.01) |
| F16D 3/02 | (2006.01) |
| F02C 7/36 | (2006.01) |

(52) U.S. Cl.
CPC .............. *F16D 3/06* (2013.01); *F01D 5/026* (2013.01); *F02C 3/107* (2013.01); *F02C 7/06* (2013.01); *F02C 7/36* (2013.01); *F16D 1/10* (2013.01); *F16D 3/02* (2013.01); *F16D 3/72* (2013.01); *F05D 2240/61* (2013.01); *F05D 2250/38* (2013.01); *F05D 2260/403* (2013.01); *F05D 2260/601* (2013.01); *F05D 2260/98* (2013.01); *F16D 2001/103* (2013.01); *F16D 2300/06* (2013.01)

(58) Field of Classification Search
CPC .......... F16D 2300/06; F16D 3/06; F16D 3/02; F16D 3/72; F16D 1/10; F16H 57/043; F01D 5/026; F05D 2260/603; F05D 2260/601; F05D 2260/98
USPC ...................................... 464/7, 16, 179–183
See application file for complete search history.

(56) References Cited

U.S. PATENT DOCUMENTS

| | | |
|---|---|---|
| 2,712,967 A | 7/1955 | Sutton |
| 2,926,755 A | 3/1960 | Kolbe |
| 3,038,556 A | 6/1962 | Hamm et al. |
| 3,667,214 A | 6/1972 | Addie |
| 3,889,489 A | 6/1975 | Casey et al. |
| 4,064,979 A | 12/1977 | Crankshaw |
| 4,201,271 A | 5/1980 | Evans |
| 4,567,784 A | 2/1986 | Hambric |

(Continued)

OTHER PUBLICATIONS

European EPO communication pursuant to Article 94(3) dated Dec. 20, 2017, for European Patent Application No. 16194309.7-1607, Applicant, Rolls-Royce Corporation, (5 pages).

(Continued)

*Primary Examiner* — Jonathan P Masinick
(74) *Attorney, Agent, or Firm* — Shumaker & Sieffert, P.A.

(57) ABSTRACT

A power transmission device includes a quill shaft having a first end and a second end, a first shaft engaged with the first end of the quill shaft, and a second shaft engaged with the second end of the quill shaft. An ejector orifice is provided at the second end of the quill shaft distal from the first shaft such that the ejector orifice forms an oblique angle with respect to the quill shaft, and the ejector orifice is adapted to eject a fluid therethrough.

18 Claims, 3 Drawing Sheets

(56) References Cited

U.S. PATENT DOCUMENTS

| | | |
|---|---|---|
| 8,789,656 B2 | 7/2014 | Eccles et al. |
| 9,677,662 B2 * | 6/2017 | Maners ................ F16H 57/043 |
| 2009/0159370 A1 | 6/2009 | Maners et al. |
| 2016/0032769 A1 * | 2/2016 | Stutz ...................... F01D 25/18 464/7 |

OTHER PUBLICATIONS

Extended European Search Report dated Mar. 8, 2017, for European Patent Application No. 16194309.7, Applicant, Rolls-Royce Corporation, (7 pages).

Extended European Search Report issued in connection with European Patent Application No. 18203821.6 dated Feb. 12, 2019 (7 pages).

European EPO Communication pursuant to Article 94(3) dated Mar. 16, 2020, for European Patent Application No. 18203821.6-1007, Applicant, Rolls-Royce Corporation, (4 pages).

Response to the Extended Search Report from counterpart EP Application No. 16194309.7 dated Mar. 8, 2017, filed Oct. 24, 2017, 30 pgs.

Response to the Communication pursuant to Article 94(3) EPC from counterpart EP Application No. 16194309.7 dated Dec. 20, 2017, filed Apr. 18, 2018, 30 pgs.

Communication under Rule 71(3) EPC from counterpart EP Application No. 16194309.7 dated Sep. 26, 2018, 36 pgs.

Response to the Extended Search Report from counterpart EP Application No. 18203821.6 dated Mar. 25, 2019, filed Sep. 17, 2019, 29 pgs.

Response to the Communication pursuant to Article 94(3) EPC from counterpart EP Application No. 18203821.6 dated Mar. 16, 2020, filed Apr. 2, 2020, 27 pgs.

\* cited by examiner

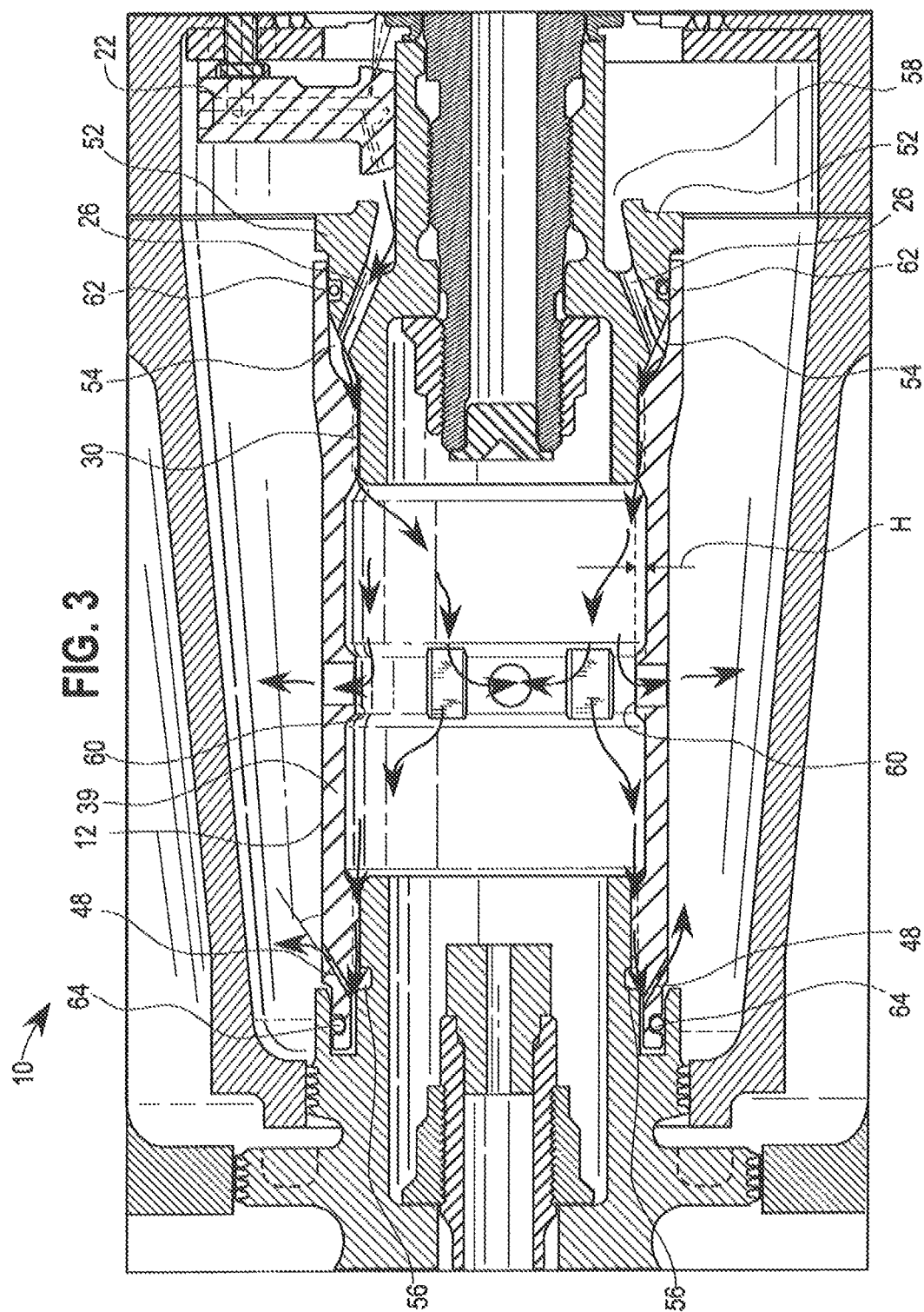

POWER TRANSMISSION DEVICE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to power transmission devices, and more particularly, to oil flow delivery in power transmission devices.

BACKGROUND

Gas turbine engines comprise a number of components that are assembled in series and axially. Some of the components are mechanically engaged and transfer power from one component to another. For example, a drive system may be utilized for providing torque to a component such as a compressor. It has been observed that large misalignments occur between the drive system and the driven component at high speeds and in warm temperature environments of about 250 degrees Fahrenheit or above. In some instances, the driving system and the driven compressor cannot be of a fixed couple during operation due to their inherent excitation loads or physical limitations to create a reliable connection. Many dynamic simulations have shown that the potential misalignment at high speeds could drive imbalance loads into the compressor, which acts as load, beyond its safe operating limits. These loads can then transfer into other components downstream in the system resulting in further damage to the gas turbine engine.

In circumstances where there is a potential for large misalignments, a quill shaft is often used as a part of a power transmission device that is disposed between the drive system and the driven component to reduce or eliminate misalignment. Traditionally, oil has been introduced into the power transmission device to lubricate the teeth on the quill shaft splines that are in engagement on both ends of the quill shaft with respective shafts of the drive system and the driven component.

Conventional power transmission devices may use grease-packed splines, separate oil injectors at the two spline locations at the two ends of the quill shaft, or holes in the quill shaft where a single or multiple injector spray(s) oil for providing some level of lubrication that provide minimal control and less robust delivery. This oil delivery mechanism has required additional parts and accessories that have added extra mass to the power transmission device. Furthermore, the additional parts and accessories necessitate more frequent and costly servicing and maintenance of the power transmission device. Thus, there is a need for a power transmission device having an oil delivery mechanism which can be blindly assembled with less access structures, is more compact, reduces the frequency of oil services for sufficient lubrication, can operate at high speeds with low mass, and can handle relatively large misalignment and independent system vibrations.

SUMMARY

According to one aspect, a power transmission device includes a quill shaft having a first end and a second end, a first shaft is engaged with the first end of the quill shaft, and a second shaft is engaged with the second end of the quill shaft. An ejector orifice is at the second end of the quill shaft distal from the first shaft such that the ejector orifice forms an oblique angle with respect to the quill shaft and the ejector orifice is adapted to eject a fluid therethrough.

According to another aspect, a power transmission device includes a quill shaft having a first end and a second end. A first shaft is engaged with the first end of the quill shaft, and a second shaft is engaged with the second end of the quill shaft. A raised boss on an interior surface of the quill shaft has an aperture therein such that the raised boss is adapted to eject a fluid through the aperture to outside of the quill shaft.

Other aspects and advantages will become apparent upon consideration of the following detailed description and the attached drawings wherein like numerals designate like structures throughout the specification.

BRIEF DESCRIPTION OF THE DRAWINGS

FIG. 3 is a fragmentary, cross-sectional, side view of the embodiment of the power transmission device of FIG. 1.

DETAILED DESCRIPTION

As shown herein a power transmission device is provided that utilizes a quill shaft having an obliquely angled ejector orifice and a raised boss with an aperture that eject a lubricating fluid from the inside to the outside of the quill shaft. The fluid is also for cooling the inside elements of the power transmission device. The fluid, for example, may be oil or other type of fluid known to those skilled in the art. The power transmission device in this embodiment provides for the control of flowrate and the volume of the oil within the power transmission device and achieves a desired cooling and lubrication of the inside elements such as the splines and their associated teeth that engage with the splines of the drive system and the driven component. The lubrication and cooling of the splines and the teeth thereof extend the life of the mechanically engaged devices. The present embodiment also provides for a single-end capture and a single-end feed of the oil through the power transmission device.

Figure 1:
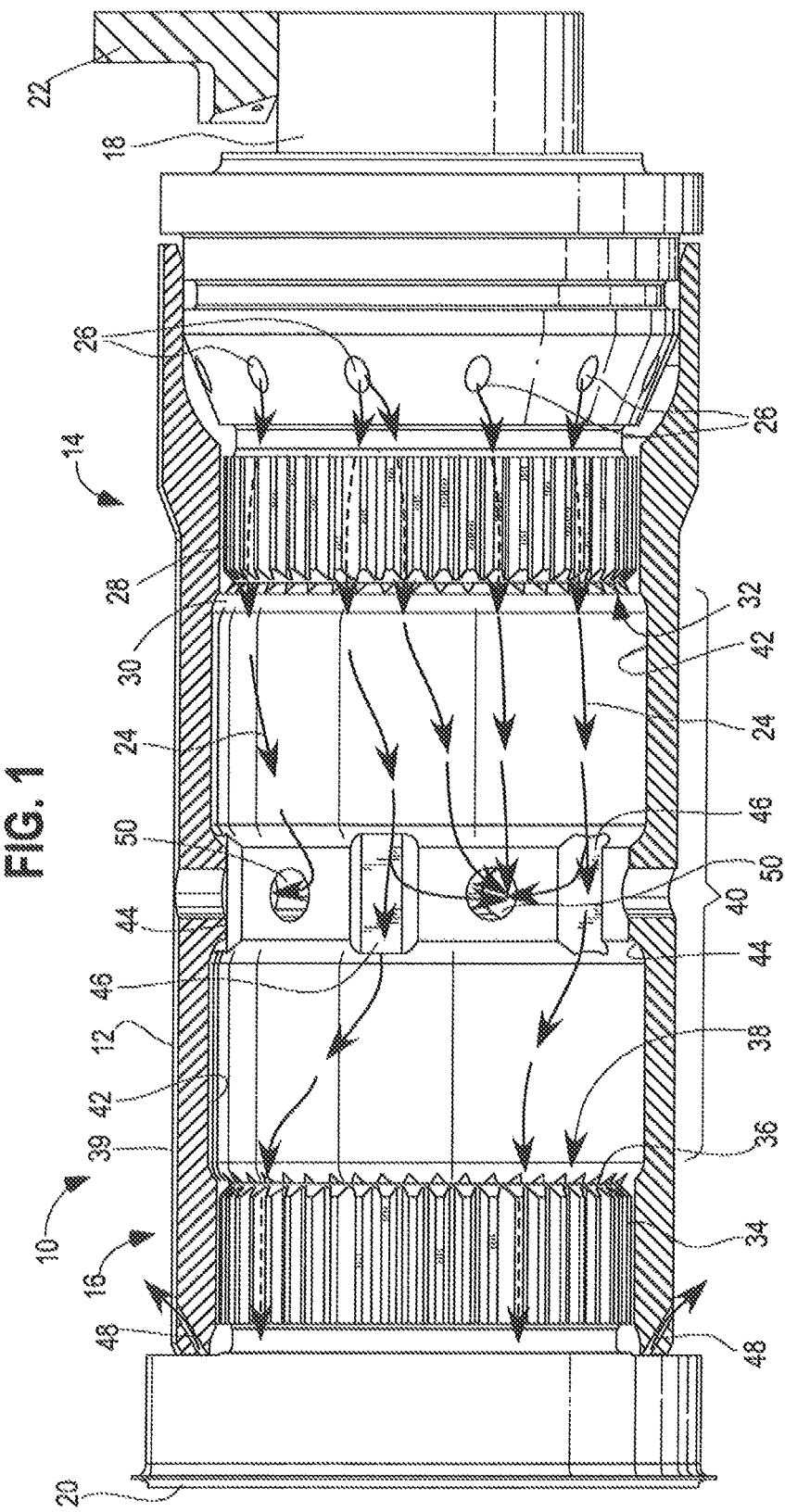
FIG. 1 is a part cross-sectional, side view of an embodiment of a power transmission device.
Figure 2:
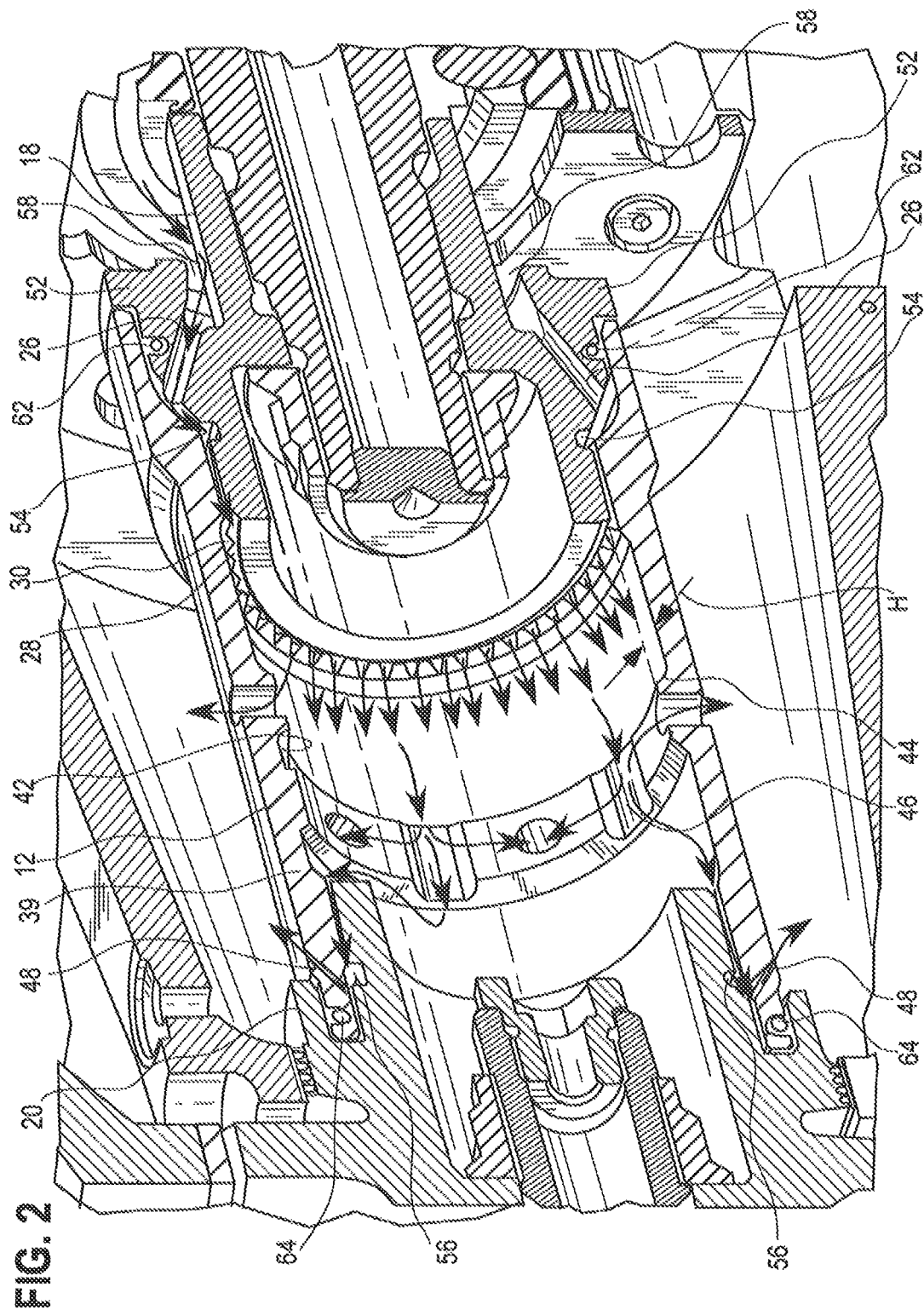
FIG. 2 is a fragmentary, isometric, cross-sectional view of the embodiment the power transmission device of FIG. 1.

Referring to FIG. 1, an embodiment of the power transmission device 10 is shown having a quill shaft 12 with a first end 14 and a second end 16. A first shaft in a form of a drive shaft 18 is engaged with the first end 14, and a second shaft for example, of a compressor (not shown) in a form of a load shaft 20 is engaged with the second end 16. A sump injector 22 delivers oil 24 (shown as arrows) via feed-through holes in a form of injection orifices 26 formed through the drive shaft 18 to the inside of the quill shaft 12. The drive shaft 18 has drive shaft splines 28, which engage teeth 30 of first splines 32 on the quill shaft 12. Similarly, the load shaft 20 has load shaft splines 34, which engage teeth 36 of second splines 38 on the quill shaft 12 located at the second end 16. An outer wall 39 encloses the quill shaft 12 and portions of the drive shaft 18 and the load shaft 20. As seen in FIGS. 2 and 3, the oil 24 flows through interface surfaces between the teeth 30 and the drive shaft spline 28 and into an intermediate portion 40 of the quill shaft 12. The oil 24 accumulates within the intermediate portion 40 against the inside wall 42 of the quill shaft 12 because of the centrifugal force of the quill shaft 12 when spinning and in operation. The accumulated oil 24 continues to flow past one or more raised bosses 44 via channels 46 that are formed between the raised bosses 44, As shown in FIG. 3, some of the oil 24 traverse interface surfaces between the teeth 36 and the load shaft splines 34. Eventually, some of the oil 24 is ejected to the outside of the quill shaft 12 through one or more ejector orifices 48 in the outer wall 39. The rest of the oil that has accumulated within the intermediate portion 40 is ejected out of apertures 50 formed in the raised bosses 44 to the outside of the quill shaft 12.

Referring to FIG. 2, a fragmentary, isometric, cross-sectional view of the example power transmission device 10 illustrates the flow of received oil 24 at the first end 14 of the quill shaft 12 and through various portions of the quill shaft 12 until ejection of the oil 24 from the ejector orifices 48 and the apertures 50. Oil 24 is received through the injection orifices 26, which are formed by an adapter 52 disposed between the inside wall 42 of the quill shaft 12 and the drive shaft 18. Because of the centrifugal force of the spinning drive shaft 18, the oil 24 is then directed toward an ingress oil cavity 54. The ingress oil cavity 54 is formed between the drive shaft 18 and the inside wall 42 of the quill shaft 12. Once the oil fills the ingress cavity 54, it then flows in an axial direction between the teeth 30 and the drive shaft splines 28. As the oil 24 flows into the intermediate portion 40, it keeps flowing past the raised bosses 44 through channels 46 and between the load shaft splines 34 and teeth 36 at the second end 16 of the quill shaft 12. The oil 24 wets and lubricates the teeth 36 and load shaft splines 34. The oil 24 reaches and pours into an egress oil cavity 56. After filling the egress oil cavity 54, the oil 24 is ejected to the outside of the quill shaft 12 through the ejector orifices 48, which are arranged circumferentially around the quill shaft 12.

The ejector orifices 48 by virtue of being obliquely angled provide a resistance to the flow of oil 24 therethrough such that the amount and flowrate of the ejected oil 24 is metered. The ejector orifices 48 are preferably obliquely angled toward the first end 14 of the quill shaft 12. The flow resistance provided by the ejector orifices 48 are such that the flowrate of oil 24 is neither too fast nor too slow. More specifically, if the oil 24 flowrate is too fast, there would be too much oil wasted and also there would not be a sufficient volume of oil 24 accumulated or pooled up against the inside wall 42 of the quill shaft to ensure that the teeth 30, 36, and the respective drive shaft splines 28, and load shaft splines 34 are wetted and lubricated adequately. Moreover, if the oil 24 flowrate is too slow, then the oil 24 will become stagnant within the quill shaft 12. This can result in higher temperatures for the teeth 30, 36 and the splines 28, 34, which can in turn lead to misalignments between the quill shaft 12, drive shaft 18, and load shaft 20. It should be noted that a size of opening of the ejector orifices 48 and the oblique angle of the ejector orifices 48 are predetermined based on the oil characteristics that is received in the power transmission device 10. The oil characteristics include, among others, the type and grade of oil, the amount and type of debris particles present in the oil, and any other elements/features that define the oil characteristics. Furthermore, the total number of ejector orifices 48 are determined based on the acuteness of the oblique angle of the ejector orifices 48 with respect to the quill shaft 12 as well as the size of the openings of the ejector orifices 48. Also, when a larger number of ejector orifices 48 are employed, the probability of having too many ejector orifices 48 plugged up with debris over an extended operation of the power transmission device 10 is decreased, thereby less frequent maintenance and service would be needed.

The raised bosses 44 have a height H as shown by the two-facing arrows. This height H determines a level to which the oil 24 must rise by pooling up against the inside wall 42 of the quill shaft 12 until it can flow out of the apertures 50. The height H should be at least at a level that the risen pooled up oil 24 can wet a sufficient portion of the teeth 30, 36 and the splines 28, 34 for desired lubrication to reduce wear and tear. As the pooled up oil 24 is ejected out of the apertures 50, any heat generated during the operation of the power transmission device 10 is transferred away by the flowing oil 24. In some circumstances, the height H may be larger than height of the teeth 30, 36 and the splines 28, 34, such that the entire height/surfaces of the teeth 30, 36 and the splines 28, 34 are wetted with pooled up oil 24 during operation. The height H of the raised bosses 44 determines the volume of the oil 24 that can pool up within the quill shaft before any excess amount of oil 24 is ejected from the apertures 50. A determination of an optimum volume/amount of the oil 24 is also influenced by the design limitations of the power transmission device 10 in so far as not compromising the device balance beyond analyzed limits during operation.

Referring to FIG. 3, injection orifices 26 have ingress apertures 58 where oil 24 is received therein. The sump injector 22 injects oil 24 at a desired angle towards the ingress apertures 58 at which point the injected oil 24 is deflected and propelled into the injection orifices 26. The rotational velocity of the drive shaft 18 slings the oil 24 through the injection orifices 26 and against the inside wall 42. A level of the ingress aperture 58 is non-coplanar with a plane defined by a top surface 60 of the raised bosses 44. Preferably the level of the ingress apertures 58 is at a height, i.e., a distance relative to the inside wall 42, that is higher than the height H of the plane of the top surface 60 of the raised bosses 44 such that when the oil 24 is pooled up within the quill shaft 12 there would not be a backflow of the oil 24 out of the ingress apertures 58. The injector orifices 26 are obliquely angled from the ingress apertures 58 toward the quill shaft 12.

The ingress oil cavity 54 is sealed on one end with an O-ring 62, so that the oil 24 is forced in one direction through the teeth 30 (also referred to as working splines). As described hereinabove, the oil 24 flows downstream until it is ejected through the ejector orifices 48. A downstream O-ring 64 prevents leaking of the oil 24 from an interface between the quill shaft 12 and the load shaft 20. The downstream O-ring 64 permits the oil 24 to accumulate in the egress oil cavity 56 before it is ejected through the ejector orifices 48.

The design options for the power transmission device 10 utilizing a quill shaft 12 having the fluid/oil delivery mechanism as described herein are not limited to any specific application and/or a specific fluid source.

INDUSTRIAL APPLICABILITY

As provided herein, the power transmission device may be employed in connection with a compressor, and more specifically a compressor intended to be used in a gas turbine engine. The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A power transmission device, comprising:
   a quill shaft having a first end and a second end;
   a first shaft engaged with the first end of the quill shaft;
   a second shaft engaged with the second end of the quill shaft;
   an injection orifice proximate the first shaft adapted to introduce a fluid into the quill shaft;
   said quill shaft comprising an outer wall that encloses the quill shaft;
   a sealing member disposed in direct sealing contact with the first shaft and with the outer wall, wherein the sealing member is adapted to prevent the fluid from leaking therebetween;
   a cavity adjacent the outer wall;
   a sump injector disposed in the cavity; and
   an ejector orifice in the outer wall proximate the second end of the quill shaft distal from the first shaft, wherein the ejector orifice forms an oblique angle with respect to the quill shaft, the ejector orifice angles toward the first end of the quill shaft, the ejector orifice terminates in an opening in a wall of the cavity, and the ejector orifice is adapted to eject the fluid therethrough such that the fluid is ejected through the opening directly into the cavity and away from the quill shaft.

2. The power transmission device of claim 1, further comprising:
   a raised boss on an interior surface of the quill shaft having an aperture therein, wherein the raised boss is adapted to eject the fluid through the aperture to outside of the quill shaft.

3. The power transmission device of claim 2, wherein the quill shaft further comprises:
   a first plurality of splines at the first end engaged with the first shaft; and
   a second plurality of splines at the second end engaged with the second shaft, wherein each of the first and second plurality of splines have teeth.

4. The power transmission device of claim 3, wherein the raised boss has a height such that the fluid flowing within the quill shaft pools up to a level of a top surface of the raised boss, whereby the fluid contacts the teeth of the first and second plurality of splines.

5. The power transmission device of claim 4, wherein the fluid is oil, and wherein a size of an opening of the ejector orifice and the oblique angle are predetermined based on the oil characteristics.

6. The power transmission device of claim 1, wherein the injection orifice is formed by an adapter disposed between the first shaft and the quill shaft.

7. The power transmission device of claim 6, further comprising:
   a raised boss on an interior surface of the quill shaft having an aperture therein, wherein the raised boss is adapted to eject the fluid through the aperture to outside of the quill shaft, wherein the injection orifice has an ingress aperture that is non-coplanar with a plane defined by a top surface of the raised boss.

8. The power transmission device of claim 7, wherein the injection orifice is obliquely angled from the ingress aperture toward the quill shaft such that the received oil is directed into the quill shaft, whereby the teeth of the quill shaft are wetted with the oil.

9. The power transmission device of claim 1, further comprising:
   a driver member coupled to the first shaft; and
   a load member coupled to the second shaft, wherein power is transmitted from the driver member through the quill shaft to the load member.

10. The power transmission device of claim 9, wherein the quill shaft further comprises:
    a first plurality of splines at the first end engaged with the first shaft; and
    a second plurality of splines at the second end engaged with the second shaft, wherein each of the first and second plurality of splines have teeth, wherein the injection orifice is obliquely angled from the ingress aperture toward the quill shaft such that the received oil is directed into the quill shaft, whereby the teeth of the quill shaft are wetted with the received oil.

11. The power transmission device of claim 10, wherein the ejector orifice angles toward the first end of the quill shaft, and wherein a size of an opening of the ejector orifice and the oblique angle are predetermined based on characteristics of the oil.

12. The power transmission device of claim 1, wherein the first shaft is a drive shaft, the second shaft is a load shaft, the ejector orifice is proximate the load shaft, and the power transmission device is configured to have oil transported from the drive shaft toward the load shaft before being ejected through the ejector orifice.

13. A power transmission device, comprising:
    a quill shaft having a first end and a second end;
    a first shaft engaged with the first end of the quill shaft;
    a second shaft engaged with the second end of the quill shaft;
    said quill shaft comprising an outer wall that encloses the quill shaft;
    a raised boss with a height (H) on an interior surface of the outer wall and having a aperture at a top surface therein, wherein the raised boss is adapted to eject a fluid through the aperture to outside of the quill shaft;
    an injection orifice adapted to receive the fluid, wherein the injection orifice is disposed proximate the first shaft and has an ingress aperture at a level higher than the height (H) of the top surface of the raised boss;

a sealing member disposed in direct sealing contact with the first shaft and with the outer wall, wherein the sealing member is adapted to prevent the fluid from leaking therebetween;

a cavity adjacent the outer wall;

a sump injector disposed in the cavity; and an ejector orifice in the outer wall proximate the second end of the quill shaft distal from the first shaft, wherein the ejector orifice forms an oblique angle with respect to the quill shaft, the ejector orifice angles toward the first end of the quill shaft, and the ejector orifice is adapted to eject a fluid therethrough such that the fluid is ejected through the outer wall directly into the cavity and away from the quill shaft.

14. The power transmission device of claim 13, wherein the quill shaft further comprises:

a first plurality of splines at the first end engaged with the first shaft; and a second plurality of splines at the second end engaged with the second shaft, wherein each of the first and second plurality of splines have teeth.

15. The power transmission device of claim 14, wherein the height (H) of the raised boss is such that the fluid flowing within the quill shaft pools up to a level of the top surface of the raised boss, whereby the fluid contacts the teeth of the first and second plurality of splines.

16. The power transmission device of claim 13, wherein the fluid is oil.

17. The power transmission device of claim 16, wherein the injection orifice is formed by an adapter disposed between the first shaft and the quill shaft.

18. The power transmission device of claim 13, wherein the first shaft is a drive shaft, the second shaft is a load shaft, the ejector orifice is proximate the load shaft, and the power transmission device is configured to have oil transported from the drive shaft toward the load shaft before being ejected through the ejector orifice.

* * * * *